United States Patent
Tai et al.

(10) Patent No.: US 10,003,071 B2
(45) Date of Patent: Jun. 19, 2018

(54) ELECTRODE STRUCTURE, METHOD OF FABRICATING THE SAME, AND LITHIUM BATTERY

(71) Applicant: National Taiwan University of Science and Technology, Taipei (TW)

(72) Inventors: Yian Tai, Taipei (TW); Bing-Joe Hwang, Taipei (TW); Kuei-Hsien Chen, Taipei (TW); Jian-Ming Chiu, Taipei (TW); Li-Chyong Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 181 days.

(21) Appl. No.: 15/011,437

(22) Filed: Jan. 29, 2016

(65) Prior Publication Data
US 2017/0018766 A1    Jan. 19, 2017

(30) Foreign Application Priority Data
Jul. 14, 2015   (TW) .............................. 104122770 A

(51) Int. Cl.
| | |
|---|---|
| *H01M 4/36* | (2006.01) |
| *H01M 4/58* | (2010.01) |
| *H01M 4/04* | (2006.01) |
| *H01M 4/13* | (2010.01) |
| *H01M 4/38* | (2006.01) |
| *H01M 4/134* | (2010.01) |
| *H01M 4/136* | (2010.01) |
| *H01M 4/1395* | (2010.01) |

(Continued)

(52) U.S. Cl.
CPC ......... *H01M 4/366* (2013.01); *H01M 4/0404* (2013.01); *H01M 4/0471* (2013.01); *H01M 4/134* (2013.01); *H01M 4/136* (2013.01); *H01M 4/1395* (2013.01); *H01M 4/1397* (2013.01); *H01M 4/38* (2013.01); *H01M 4/5815* (2013.01); *H01M 4/382* (2013.01); *H01M 10/052* (2013.01); *H01M 2004/027* (2013.01)

(58) Field of Classification Search
CPC ..................................................... H01M 4/366
See application file for complete search history.

(56) References Cited

U.S. PATENT DOCUMENTS

| | | | | |
|---|---|---|---|---|
| 2011/0294007 A1* | 12/2011 | Hosaka | .................. | H01M 2/08 429/210 |
| 2013/0168825 A1 | 7/2013 | Bhattacharya | | |

(Continued)

FOREIGN PATENT DOCUMENTS

TW        I443840        7/2014

OTHER PUBLICATIONS

Junjie Li et al., "Wet chemical route to the synthesis of kesterite Cu2ZnSnS4 nanocrystals and their applications in lithium ion. batteries",Materials Letters,vol. 92,Feb. 2013, pp. 330-333.

(Continued)

*Primary Examiner* — Matthew J Merkling
(74) *Attorney, Agent, or Firm* — JCIPRNET

(57) ABSTRACT

An electrode structure is provided. The electrode structure includes a substrate, a buffer layer, and a nano-material layer. The buffer layer is disposed on the substrate. The nano-material layer is disposed on the buffer layer, wherein the structure of the nano-material layer is nanowall.

5 Claims, 5 Drawing Sheets

(51) Int. Cl.
*H01M 4/1397* (2010.01)
*H01M 4/02* (2006.01)
*H01M 10/052* (2010.01)

(56) References Cited

U.S. PATENT DOCUMENTS

2014/0178602 A1    6/2014   Angelini et al.
2016/0344020 A1*  11/2016  Tzeng .................. H01M 4/366

OTHER PUBLICATIONS

"Office Action of Taiwan Counterpart Application," dated Feb. 8, 2017, p. 1-p. 3.
Yin et al., "Hierarchical porous Cu2ZnSnS4 films for high-capacity reversible lithium storage applications," Journal of Materials Chemistry A, Apr. 29, 2013, pp. 7927-7932.
Zhou et al, "Solvothermal synthesis of flower-like Cu2ZnSnS4 nanostructures and their application as anode materials for lithium-ion batteries," Chemical Physics Letters, Aug. 3, 2012, pp. 115-119.
Yang et al, "Microwave-assisted synthesis of Cu2ZnSnS4 nanocrystals as a novel anode material for lithium ion battery," J Nanopart Res, Jun. 10, 2012, pp. 1-6.
I-Ming Chen, "The study of using Cu2ZnSnS4 hierarchical structure as counter electrode for Dye-Sensitized Solar Cells," Master Degree Thesis, National Taiwan University of Science and Technology, Jan. 2015, pp. 1-232.

\* cited by examiner

ELECTRODE STRUCTURE, METHOD OF FABRICATING THE SAME, AND LITHIUM BATTERY

CROSS-REFERENCE TO RELATED APPLICATION

This application claims the priority benefit of Taiwan application serial no. 104122770, filed on Jul. 14, 2015. The entirety of the above-mentioned patent application is hereby incorporated by reference herein and made a part of this specification.

BACKGROUND OF THE INVENTION

Field of the Invention

The invention relates to an electrode structure, and more particularly, to an electrode structure including a nanowall structure, a method of fabricating the same, and a lithium battery including the same.

Description of Related Art

Since primary batteries do not meet environmental requirements, the market demand for lithium batteries that can be repeatedly charged and discharged and having features such as lightweight, high voltage value, and high energy density has gradually increased, and the applicability and the potential for expansion of lithium batteries in specifically light electric vehicles, electric vehicles, and the large-scale electricity storage industry are very high.

In recent years, it can be known from the production status of high-capacity batteries of various existing lithium battery manufacturers around the world that, the development of high-capacity lithium batteries has become another trend of the lithium battery field. From the perspective of battery design, the anode and cathode material system, the electrode plate formula, and the battery process etc. need to be considered at the same time to achieve the best battery capacity design. However, in the lithium battery field, a carbon-based anode material has been used for more than 20 years, and not only the theoretical electric capacity reaches the bottleneck of 372 mAh/g, but also the carbon-based anode material has slower charge and discharge rates. Therefore, the development of a novel anode material providing the battery with high cycle life and high capacity is one of the current objects for those skilled in the art.

SUMMARY OF THE INVENTION

The invention provides an electrode structure and a method of fabricating the same. The electrode structure is used as the anode of a lithium battery, such that the lithium battery has high cycle life and high capacity.

An electrode structure of the invention includes a substrate, a buffer layer, and a nano-material layer. The buffer layer is disposed on the substrate. The nano-material layer is disposed on the buffer layer, wherein the structure of the nano-material layer is nanowall.

In an embodiment of the invention, the material of the substrate includes metal foil, transparent conductive glass, carbon material, silicon, or an organic polymer thin film.

In an embodiment of the invention, the material of each of the buffer layer and the nano-material layer includes a copper-zinc-tin-sulfur compound, and the atomic ratio of sulfur in the buffer layer and the atomic ratio of sulfur in the nano-material layer are different.

In an embodiment of the invention, the nano-material layer is hydrophilic.

In an embodiment of the invention, the thickness of the buffer layer is 50 nanometers to 300 nanometers, and the thickness of the nano-material layer is 500 nanometers to 4000 nanometers.

A method of fabricating an electrode structure of the invention includes the following steps. First, a substrate is provided. Then, the substrate is placed in a first precursor solution, and a first heating process is performed to form a buffer layer on the substrate. Then, the substrate is placed in a second precursor solution, and a second heating process is performed to form a nano-material layer on the buffer layer, wherein the structure of the nano-material layer is nanowall.

In an embodiment of the invention, the first precursor solution and the second precursor solution each independently include a copper salt, a zinc salt, a tin salt, a sulfur-containing substance, and a solvent, the copper salt includes copper chloride, copper acetate, or copper nitrate, the zinc salt includes zinc chloride, zinc acetate, or zinc nitrate, the tin salt includes tin chloride, tin acetate, or tin nitrate, the sulfur-containing substance includes sulfur powder or thiourea, and the solvent includes ethanol or water, wherein the mole ratio of the tin salt and the sulfur-containing substance in the first precursor solution and the mole ratio of the tin salt and the sulfur-containing substance in the second precursor solution are different.

In an embodiment of the invention, the mole ratio of the tin salt and the sulfur-containing substance in the first precursor solution and the mole ratio of the tin salt and the sulfur-containing substance in the second precursor solution are each independently 1:2 to 1:10.

In an embodiment of the invention, the first heating process and the second heating process are each independently a hydrothermal synthesis process, the process temperature of the first heating process is 100° C. to 250° C., the process time of the first heating process is 10 minutes to 2 hours, the process temperature of the second heating process is 100° C. to 400° C., and the process time of the second heating process is 6 hours to 48 hours.

A lithium battery of the invention includes an anode, a cathode, a polymer separator, an electrolyte solution, and a package structure. The anode includes the electrode structure. The cathode and the anode are separately disposed. The polymer separator is disposed between the anode and the cathode, and the polymer separator, the anode, and the cathode define a housing region. The electrolyte solution is disposed in the housing region. The package structure packages the anode, the cathode, and the electrolyte solution.

Based on the above, the electrode structure of the invention is a novel electrode structure including a substrate, a buffer layer, and a nano-material layer for which the structure is nanowall. Moreover, by including the buffer layer and the nano-material layer, the electrode structure of the invention has good stability, service life, and can be rapidly charged and discharged and is suitable for application in a lithium battery. Moreover, by including the electrode structure, the lithium battery of the invention has good capacity, good cycle life, good device stability, and rapid charge and discharge characteristics at the same time. Moreover, by performing the first heating process to directly grow the buffer layer on the substrate, the fabrication method of the electrode structure of the invention is not limited by the substrate material, and has the advantages of simple process and low cost.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with any numerical value and the smaller numerical range in the specification.

To prepare an electrode structure having good stability, service life, rapid charge and discharge, and suitable for application in a lithium battery, the invention provides an electrode structure capable of achieving the above advantages. In the following, embodiments are listed as examples of actual implementation of the invention.

Figure 1:
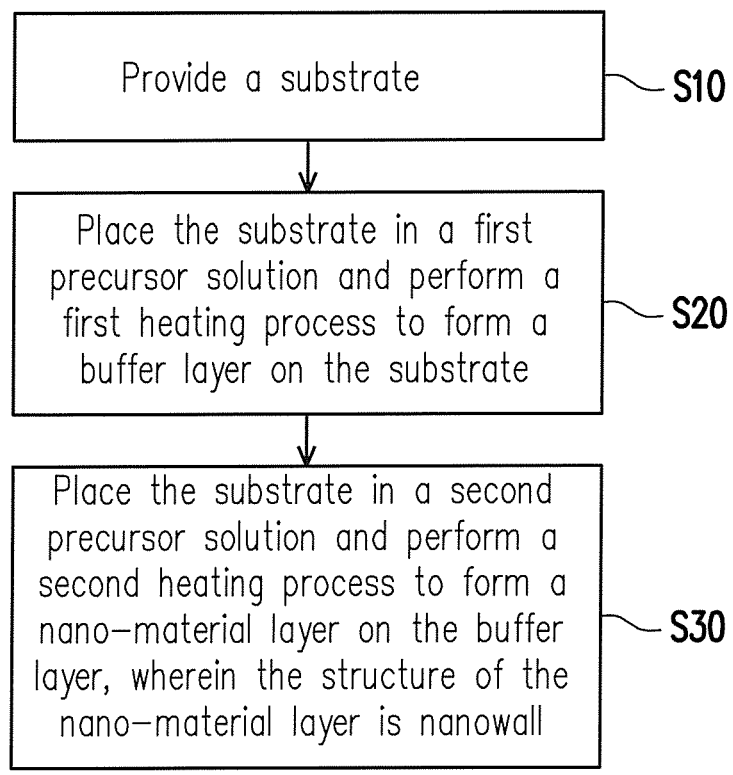
FIG. 1 is a fabrication flowchart of an electrode structure according to an embodiment of the invention.
Figure 2:
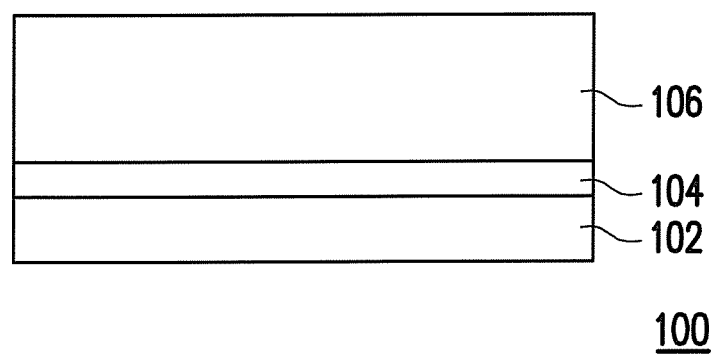
FIG. 2 is a schematic of an electrode structure according to an embodiment of the invention.

FIG. 1 is a fabrication flowchart of an electrode structure according to an embodiment of the invention. FIG. 2 is a schematic of an electrode structure according to an embodiment of the invention. In FIG. 2, to clearly show the features of the invention, each of the layers is not necessarily drawn to actual scale or structure.

Referring to both FIG. 1 and FIG. 2, step S10 is performed, in which a substrate 102 is provided. The material of the substrate 102 includes metal foil, transparent conductive glass, carbon material, silicon, or an organic polymer thin film. In other words, in the present embodiment, the substrate 102 can be a rigid substrate or a flexible substrate.

Then, step S20 is performed, in which the substrate 102 is placed in a first precursor solution, and a first heating process is performed to form a buffer layer 104 on the substrate 102. In step S20, the first precursor solution includes a copper salt, a zinc salt, a tin salt, a sulfur-containing substance, and a solvent, wherein the copper salt is, for instance, copper chloride, copper acetate, or copper nitrate, the zinc salt is, for instance, zinc chloride, zinc acetate, or zinc nitrate, the tin salt is, for instance, tin chloride, tin acetate, or tin nitrate, the sulfur-containing substance is, for instance, sulfur powder or thiourea, and the solvent is, for instance, ethanol or water. Specifically, the mole ratio of the tin salt and the sulfur-containing substance in the first precursor solution is 1:2 to 1:10, preferably 1:2 to 1:4. If the mole ratio of the tin salt and the sulfur-containing substance is less than 1:2, then the structure of the buffer layer 104 formed after the first heating process is performed is a nano-rod structure and not the desired nano-network structure; if the mole ratio of the tin salt and the sulfur-containing substance is higher than 1:10, then the structure of the buffer layer 104 formed after the first heating process is performed is a nano-cluster structure and not the desired nano-network structure.

In an embodiment, the preparation method of the first precursor solution includes: placing a copper salt, a zinc salt, a tin salt, a sulfur-containing substance, and a solvent in a stirrer and performing stirring for 5 minutes to 60 minutes to uniformly dissolve the copper salt, the zinc salt, the tin salt, and the sulfur-containing substance in the solvent to form the first precursor solution.

Moreover, in step S20, the first heating process is a hydrothermal synthesis process. Specifically, in an embodiment, the method of performing the first heating process to form the buffer layer 104 on the substrate 102 includes the following steps. First, the substrate 102 and the first precursor solution are placed inside a hydrothermal autoclave. Then, the hydrothermal autoclave is placed inside an oven to perform hydrothermal synthesis, wherein the temperature of the hydrothermal synthesis is about between 100° C. and 250° C., preferably between 100° C. and 200° C., and the time of the hydrothermal synthesis is about between 10 minutes and 2 hours, preferably between 10 minutes and 1 hour.

Moreover, in step S20, the material of the buffer layer 104 includes a copper-zinc-tin-sulfur compound, and the thickness of the buffer layer 104 is 50 nanometers to 300 nanometers. Specifically, during the first heating process of the substrate 102 and the first precursor solution, a phase transition occurs to the copper salt, the zinc salt, the tin salt, and the sulfur-containing substance, so that the copper-zinc-tin-sulfur compound is directly grown on the substrate 102. In other words, in step S20, regardless of the material of the substrate 102, the buffer layer 104 can be directly formed on the substrate 102. As a result, in comparison to a known method in which the slurry composition needs to be adjusted according to different substrate materials and a copper-zinc-tin-sulfur compound is formed on the substrate via a coating method, the method of forming the buffer layer 104 is not limited by the substrate material, and therefore the resulting electrode structure has wide applicability; and in comparison to a known method of forming the copper-zinc-tin-sulfur compound, such as a microwave-assisted solvothermal method, a dip pyrolysis method, a thermal evaporation method, and a RF-sputtering method, the method of forming the buffer layer 104 does not require a large amount of funds to purchase expensive equipment, and the steps are simple, and therefore the method has the advantages of simple process and low cost.

More specifically, when the first precursor solution has the above specific component ratio and the temperature and the time of the hydrothermal synthesis are within the above ranges, the structure of the buffer layer 104 grown on the substrate 102 can be a nano-network structure. In other words, the structure of the buffer layer 104 has a plurality of pores.

Then, step S30 is performed, in which the substrate 102 is placed in a second precursor solution, and a second heating process is performed to form a nano-material layer 106 on the buffer layer 104 so as to complete the fabrication of the electrode structure 100, wherein the structure of the nano-material layer 106 is a nanowall structure. In step S30, the second precursor solution includes a copper salt, a zinc salt, a tin salt, a sulfur-containing substance, and a solvent, wherein the copper salt is, for instance, copper chloride, copper acetate, or copper nitrate, the zinc salt is, for instance, zinc chloride, zinc acetate, or zinc nitrate, the tin salt is, for instance, tin chloride, tin acetate, or tin nitrate, the sulfur-containing substance is, for instance, sulfur powder or thiourea, and the solvent is, for instance, ethanol or water. Specifically, the mole ratio of the tin salt and the sulfur-containing substance in the second precursor solution is 1:2 to 1:10, preferably 1:2 to 1:6. If the mole ratio of the tin salt and the sulfur-containing substance is less than 1:2, then the structure of the nano-material layer 106 formed after the second heating process is performed is a nano-column structure and not the desired nanowall structure; if the mole ratio of the tin salt and the sulfur-containing substance is higher than 1:10, then the structure of the nano-material layer 106 formed after the second heating process is performed is a nano-sphere structure and not the desired nanowall structure. More specifically, the mole ratio of the tin salt and the sulfur-containing substance in the second precursor solution and the mole ratio of the tin salt and the sulfur-containing substance in the first precursor solution are different.

In an embodiment, the preparation method of the second precursor solution includes: placing a copper salt, a zinc salt, a tin salt, a sulfur-containing substance, and a solvent in a stirrer and performing stirring for 5 minutes to 60 minutes to uniformly dissolve the copper salt, the zinc salt, the tin salt, and the sulfur-containing substance in the solvent to form the second precursor solution.

Moreover, in step S30, the second heating process is a hydrothermal synthesis process. Specifically, in an embodiment, the method of performing the second heating process to form the nano-material layer 106 on the buffer layer 104 includes the following steps. First, the substrate 102 and the second precursor solution are placed inside a hydrothermal autoclave. Then, the hydrothermal autoclave is placed inside an oven to perform hydrothermal synthesis, wherein the temperature of the hydrothermal synthesis is about between 100° C. and 400° C., preferably between 100° C. and 250° C., and the time of the hydrothermal synthesis is about between 6 hours and 48 hours, preferably between 6 hours and 15 hours.

Moreover, in step S30, the material of the nano-material layer 106 includes a copper-zinc-tin-sulfur compound. In other words, in step S30, the material of the nano-material layer 106 includes a copper-zinc-tin-sulfur nanowall. Specifically, during the second heating process of the substrate 102 and the second precursor solution, a phase transition occurs to the copper salt, the zinc salt, the tin salt, and the sulfur-containing substance, so that a copper-zinc-tin-sulfur nanowall is directly grown on the buffer layer 104. More specifically, in step S30, the buffer layer 104 is used as a seed layer for growing the nano-material layer 106 on the substrate 102. From another perspective, although the material of the buffer layer 104 and the material of the nano-material layer 106 both include the copper-zinc-tin-sulfur compound, as described above, since the mole ratio of the tin salt and the sulfur-containing substance in the second precursor solution and the mole ratio of the tin salt and the sulfur-containing substance in the first precursor solution are different, the atomic ratio of sulfur in the buffer layer 104 and the atomic ratio of sulfur in the nano-material layer 106 are different. In an embodiment, the atomic ratio of sulfur in the buffer layer 104 is less than the atomic ratio of sulfur in the nano-material layer 106. Moreover, the thickness of the nano-material layer 106 is 500 nanometers to 4000 nanometers.

More specifically, in the present embodiment, since the material of the nano-material layer 106 includes the copper-zinc-tin-sulfur nanowall, not only can the nano-material layer 106 react with lithium ions via copper, zinc, and tin therein to form an alloy, and react with lithium ions via sulfur therein to form a sulfide, but also the nano-material layer 106 can let a substance (such as lithium ions) rapidly enter and leave it via pores in the nanowall structure, and good buffering effect is thus provided to the volume expansion/contraction phenomenon caused by the entering and leaving of the substance. As a result, when the electrode structure 100 is used as the electrode of the lithium battery, the electrode structure 100 can perform conversion reaction and intercalation reaction at the same time to drive the lithium battery, such that the electrode structure 100 has the characteristics of good stability and service life, and rapid charge and discharge at the same time.

Moreover, in the present embodiment, since the nano-material layer 106 is grown by using the buffer layer 104 as the seed layer, the nano-material layer 106 can have good crystallinity and the adhesion between the nano-material layer 106 and the substrate 102 can also be increased, such that better device stability is achieved. Moreover, as described above, the buffer layer 104 also has pores, so that a substance (such as lithium ions) can also rapidly enter and leave the buffer layer 104 via the pores, and good buffering effect is thus provided to the volume expansion/contraction phenomenon caused by the entering and leaving of the substance. As a result, by using the buffer layer 104 as the seed layer for growing the nano-material layer 106, in comparison to a known electrode structure, the electrode structure 100 has a greater surface area capable of reacting with the substance.

It should be mentioned that, in the present embodiment, the nano-material layer 106 is formed by performing the second heating process of the second precursor solution having different component mole ratios from the first precursor solution and the substrate 102, after the first heating process of the first precursor solution and the substrate 102 is completed. In other words, the forming of the nano-material layer 106 is achieved by adjusting the mole ratio of copper salt, zinc salt, tin salt, and sulfur-containing substance in the first precursor solution and the mole ratio of copper salt, zinc salt, tin salt, and sulfur-containing substance in the second precursor solution. For instance, in an embodiment, the mole ratio of copper salt, zinc salt, and tin salt in the first precursor solution and the mole ratio of copper salt, zinc salt, and tin salt in the second precursor solution are the same, and the mole proportion of sulfur-containing substance in the first precursor solution is less than the mole proportion of the sulfur-containing substance in the second precursor solution. Specifically, the mole ratio of copper salt, zinc salt, tin salt, and sulfur-containing substance in the first precursor solution is 2:1:1:3, and the mole ratio of copper salt, zinc salt, tin salt, and sulfur-containing substance in the second precursor solution is 2:1:1:6; or the mole ratio of copper salt, zinc salt, tin salt, and sulfur-containing substance in the first precursor solution is 2:1:1:1, and the mole ratio of copper salt, zinc salt, tin salt, and sulfur-containing substance in the second precursor solution is 2:1:1:6; or the mole ratio of copper salt, zinc salt, tin salt, and sulfur-containing substance in the first precursor solution is 2:1:1:2, and the mole ratio of copper salt, zinc salt, tin salt, and sulfur-containing substance in the second precursor solution is 2:1:1:6; or the mole ratio of copper salt, zinc salt, tin salt, and sulfur-containing substance in the first precursor solution is 2:1:1:2, and the mole ratio of copper salt, zinc salt, tin salt, and sulfur-containing substance in the second precursor solution is 2:1:1:4; or the mole ratio of copper salt, zinc salt, tin salt, and sulfur-containing substance in the first precursor solution is 2:1:1:1, and the mole ratio of copper salt, zinc salt, tin salt, and sulfur-containing substance in the second precursor solution is 2:1:1:5. From another perspective, in the present embodiment, by performing two heating processes (i.e., the first heating process and the second heating process), the buffer layer 104 and the nano-material layer 106 having different nano structures can be formed.

Moreover, in the present embodiment, the nano-material layer 106 is hydrophilic. Specifically, since the second precursor solution includes a polar solvent (such as ethanol or water), the surface of the nano-material layer 106 grown via the second heating process is covered with hydroxyl groups (—OH). In other words, in the present embodiment, the material of the nano-material layer 106 includes the copper-zinc-tin-sulfur compound containing oxygen atom. More specifically, in the present embodiment, since the nano-material layer 106 is hydrophilic, when the electrode structure 100 is used as the electrode of the lithium battery, in comparison to a known lithium battery, the electrolyte solution generally adopting a polar solvent is more readily diffused into the nano-material layer 106.

By performing all of the steps (S10 to S30) above, the electrode structure 100 of an embodiment of the invention can be obtained. Referring further to FIG. 2, the electrode structure 100 includes the substrate 102, the buffer layer 104 disposed on the substrate 102, and the nano-material layer 106 disposed on the buffer layer 104, wherein the structure of the nano-material layer 106 is nanowall. The material, the characteristics, the forming method, and the efficacy etc. of the substrate 102, the buffer layer 104, and the nano-material layer 106 are described in detail above and are therefore not repeated herein.

It can be known from the above embodiments that, the electrode structure of the invention is suitable for a lithium battery. In the following, the lithium battery of the invention is described in detail with reference to FIG. 3. However, the lithium battery of the invention is not limited to FIG. 3. Those having ordinary skill in the art should understand the lithium battery of the invention can have the structure of any lithium battery known to those having ordinary skill in the art from the description of a lithium battery 200 of FIG. 3 below.

Figure 3:
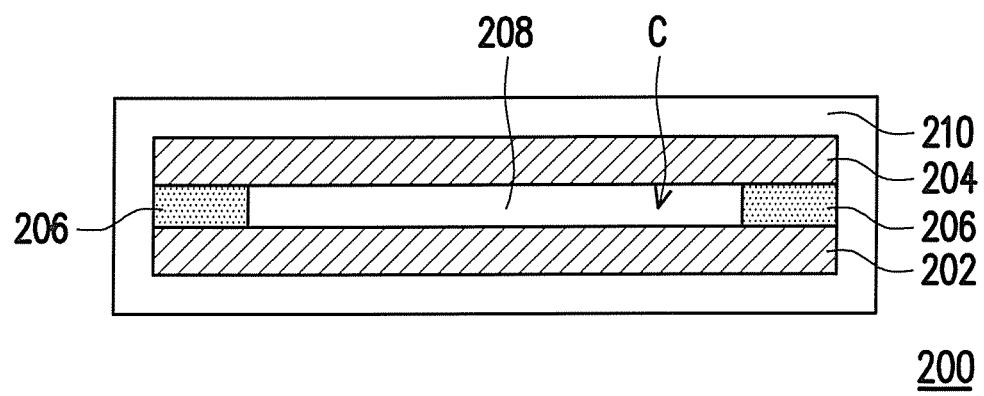
FIG. 3 is a schematic of a lithium battery according to an embodiment of the invention.

FIG. 3 is a schematic of a lithium battery according to an embodiment of the invention.

Referring to FIG. 3, the lithium battery 200 includes an anode 202, a cathode 204, a polymer separator 206, an electrolyte solution 208, and a package structure 210.

The anode 202 has the same structure as the electrode structure 100. In other words, the anode 202 includes the substrate 102, the buffer layer 104, and the nano-material layer 106. Specifically, in the present embodiment, the substrate 102 is used as an anode current collecting plate, and the buffer layer 104 and the nano-material layer 106 are used as an anode active material.

The cathode 204 and the anode 202 are separately disposed. The cathode 204 can be any cathode known to those having ordinary skill in the art. In an embodiment, the cathode 204 includes a cathode metal foil and a cathode active material, and the cathode active material is, for instance, disposed on the cathode metal foil through coating or sputtering. The cathode metal foil is, for instance, a copper foil, an aluminum foil, a nickel foil, or a high-conductivity stainless steel foil. The cathode active material is, for instance, $LiCoO_2$, $LiFePO_4$, or $LiNiMnO_4$. In another embodiment, the cathode 204 is, for instance, copper.

The polymer separator 206 is disposed between the anode 202 and the cathode 204 to separate the anode 202 and the cathode 204, and the polymer separator 206, the anode 202, and the cathode 204 define a housing region C. The polymer separator 206 can be any polymer separator known to those having ordinary skill in the art. In an embodiment, the material of the polymer separator 206 is, for instance, an insulating material, and the insulating material can be polyethylene (PE), polypropylene (PP), or a multilayer composite structure of the materials, such as PE/PP/PE.

The electrolyte solution 208 is disposed in the housing region C. The electrolyte solution 208 can be any electrolyte solution known to those having ordinary skill in the art. In an embodiment, the electrolyte solution 208 includes an organic solvent and lithium salt. Moreover, the electrolyte solution 208 can further include an additive as needed.

The organic solvent is, for instance, propylene carbonate (PC), ethylene carbonate (EC), or dialkyl carbonate, wherein dialkyl carbonate includes dimethyl carbonate (DMC), diethyl carbonate (DEC), ethyl methyl carbonate (EMC), or a combination thereof.

The lithium salt is, for instance, $LiPF_6$, $LiBF_4$, $LiClO_4$, $LiAsF_6$, $LiSbF_6$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, or a combination thereof.

The additive is, for instance, vinylene carbonate (VC).

The package structure 210 is used to package the anode 202, the cathode 204, and the electrolyte solution 208. The package structure 212 can be any package structure known to those having ordinary skill in the art. In an embodiment, the material of the package structure 212 is, for instance, aluminum foil or aluminum shell.

It should be mentioned that, as described above, in the present embodiment, since the anode 202 includes the nano-material layer 106, not only can the anode 202 react with lithium ions via copper, zinc, tin, and sulfur therein such that a conversion reaction occurs to the anode 202 and the electrolyte solution 208, but also the anode 202 can let lithium ions rapidly immigrate and emigrate it via the pores in the nanowall structure to perform an intercalation reaction, such that the volume expansion/contraction phenomenon caused by the immigration and the emigration of lithium ions is buffered. In this way, the lithium battery 200 can have good capacity, good cycle life, and rapid charge and discharge characteristics at the same time.

Moreover, as described above, in the present embodiment, since the anode 202 includes the buffer layer 104, the pores in the buffer layer 104 can further provide a diffusion path for lithium ions and further provide a buffering effect to the anode 202 against the volume expansion/contraction phenomenon caused by the immigration and the emigration of lithium ions.

Moreover, as described above, in the present embodiment, since the anode 202 includes the hydrophilic nano-material layer 106, the polar electrolyte solution 208 can be readily diffused into the nano-material layer 106, and as a result the battery efficiency of the lithium battery 200 is increased.

The features of the invention are more specifically described in the following with reference to Example 1. Although the following Example 1 is described, the materials used and the amount and ratio thereof, as well as handling details and handling process etc., can be suitably modified without exceeding the scope of the invention. Accordingly, restrictive interpretation should not be made to the invention based on example 1 described below.

EXAMPLE 1

Preparation of Pixel Structure

First, a first precursor solution was prepared. 2 millimoles of copper acetate (i.e., copper salt), 1 millimole of zinc chloride (i.e., zinc salt), 1 millimole of tin chloride (i.e., tin salt), and 3 millimoles of thiourea (i.e., sulfur-containing substance) were added in 200 mL of ethanol (i.e., solvent), and stirring was performed using a stirrer for about 30 minutes to sufficiently dissolve copper acetate, zinc chloride, tin chloride, and thiourea.

Figure 4:
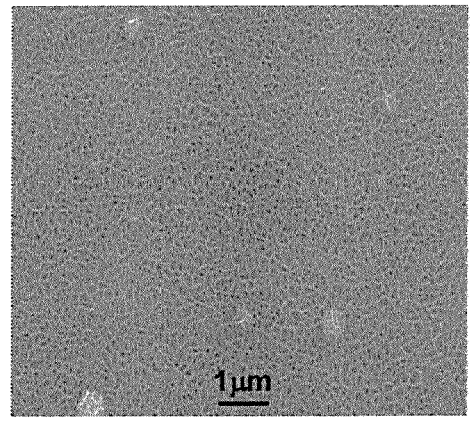
FIG. 4 is a scanning electronic microscopy (SEM) micrograph of the buffer layer of Example 1.

Then, the buffer layer of Example 1 was prepared. The obtained first precursor solution and soda glass (i.e., substrate) were placed inside a hydrothermal autoclave, and then the hydrothermal autoclave was placed inside an oven. Then, hydrothermal synthesis was performed at 120° C. for 60 minutes to form the buffer layer of Example 1 having the thickness of 300 nanometers on the soda glass (as shown in FIG. 4).

Then, a second precursor solution was prepared. 2 millimoles of copper acetate (i.e., copper salt), 1 millimole of zinc chloride (i.e., zinc salt), 1 millimole of tin chloride (i.e., tin salt), and 6 millimoles of thiourea (i.e., sulfur-containing substance) were added in 200 mL of ethanol (i.e., solvent), and stirring was performed using a stirrer for about 60 minutes to sufficiently dissolve copper acetate, zinc chloride, tin chloride, and thiourea.

Figure 5:
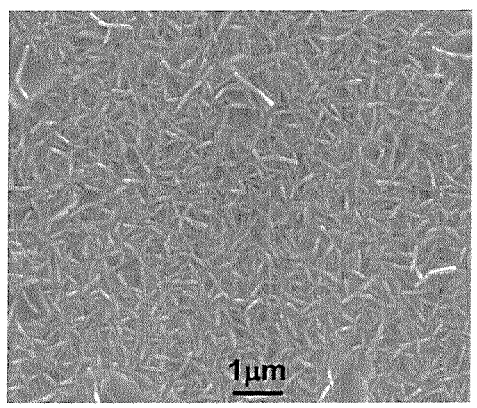
FIG. 5 is a scanning electronic microscopy (SEM) micrograph of the nano-material layer of Example 1.

Then, the nano-material layer of Example 1 was prepared. The obtained second precursor solution and the soda glass (i.e., substrate) on which the buffer layer of Example 1 was formed were placed inside a hydrothermal autoclave, and then the hydrothermal autoclave was placed inside an oven. Then, hydrothermal synthesis was performed at 200° C. for 18 hours to form the nano-material layer of Example 1 having the thickness of 3000 nanometers (as shown in FIG. 5).

Figure 6:
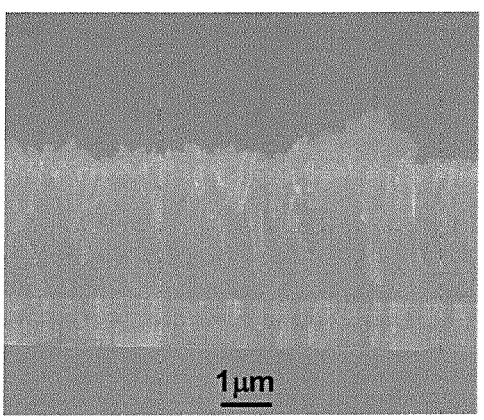
FIG. 6 is a scanning electronic microscopy (SEM) micrograph of the electrode structure of Example 1.

After all of the steps above were completed, the electrode structure (as shown in FIG. 6) of Example 1 was obtained.

Fabrication of Lithium Battery

A CR2032-type coin half-cell was assembled, wherein the electrode structure of Example 1 was used as the cathode, Li metal was used as the anode, 1 M $LiPF_6$ (solvent was a mixture of ethylene carbonate (EC) and diethyl carbonate (DEC) having a volume ratio of 1:1) was used as the electrolyte solution, a polypropylene film (product name: Celgard 2400) was used as the polymer separator, and aluminum shell was used as the package structure. Here, the lithium battery of Example 1 was obtained.

Figure 7:
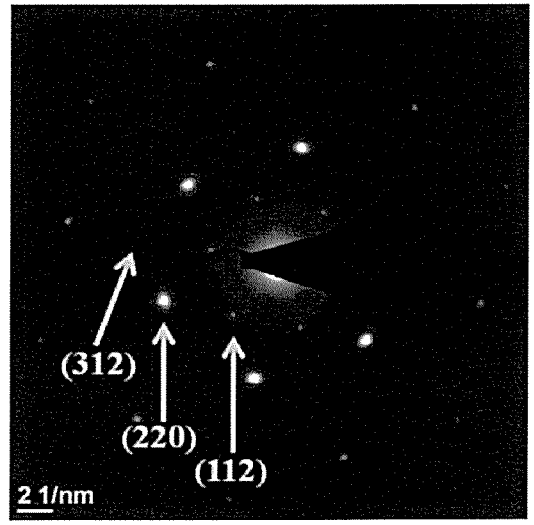
FIG. 7 is a transmission electronic microscopy (TEM) selected-area diffraction spectrum of the nano-material layer of Example 1.
Figure 8:
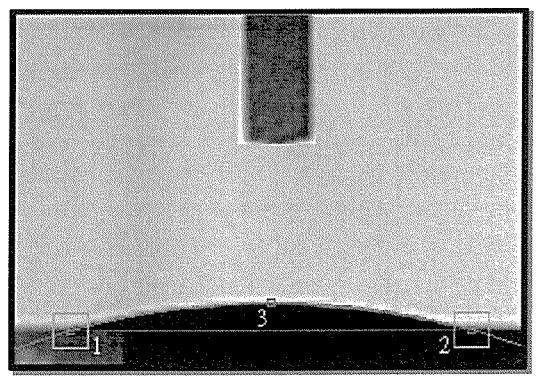
FIG. 8 is the contact angle measurement result of the electrode structure of Example 1.

Moreover, before the fabrication of the lithium battery, measurements of crystallinity and crystal direction can be performed on the nano-material layer of Example 1, and measurement of contact angle can be performed on the electrode structure of Example 1, wherein the results are respectively as shown in FIG. 7 and FIG. 8.

Figure 9:
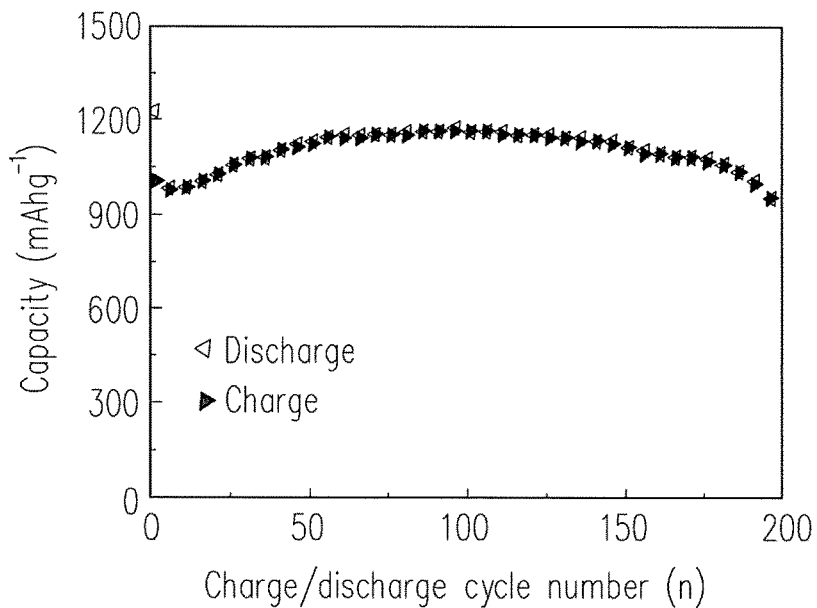
FIG. 9 shows the relationship between charge/discharge cycle number and capacity of the lithium battery of Example 1.
Figure 10:
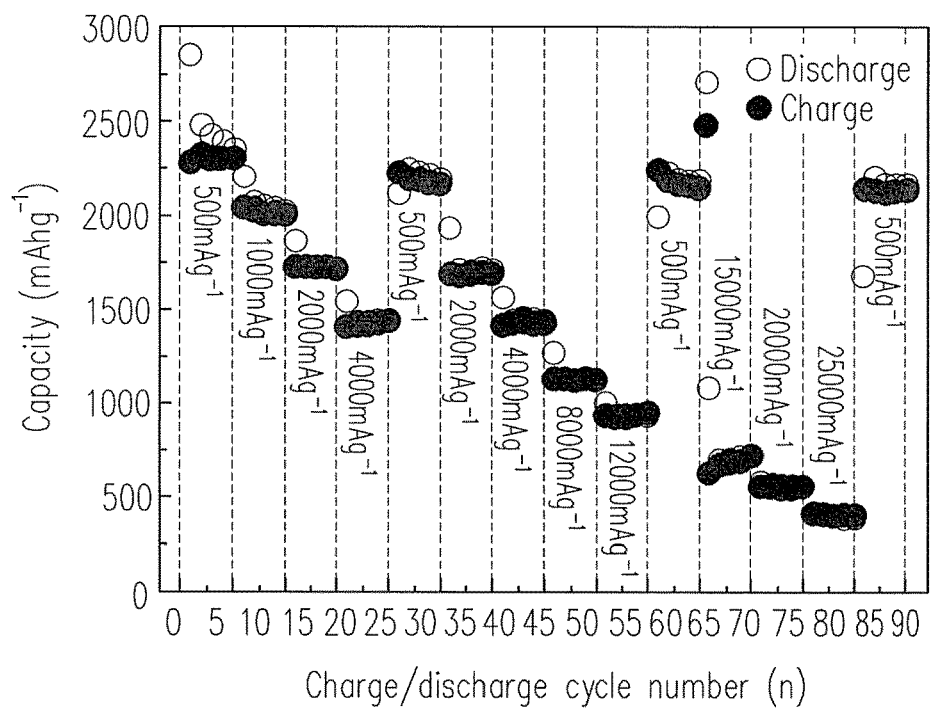
FIG. 10 shows the relationship between charge/discharge cycle number and capacity of the lithium battery of Example 1.

Then, long cycle test and rate capability test were performed on the lithium battery of Example 1, and the measurement results thereof are respectively as shown in FIG. 9 and FIG. 10.

<Measurements of Crystallinity and Crystal Direction>

FIG. 7 is a transmission electronic microscopy (TEM) selected-area diffraction spectrum of the nano-material layer of Example 1. Referring to FIG. 7, it can be known from the lattice points shown that, the nano-material layer of Example 1 had good crystallinity and crystal direction having specific directionality.

<Measurement of Contact Angle>

First, a micropipette was used to add a specific amount of deionized water dropwise on the surface of the electrode structure of Example 1 (i.e., the surface of the nano-material layer of Example 1). Then, static contact angle of the electrode structure surface of Example 1 (i.e., the nano-material layer surface of Example 1) was calculated using a computer analysis software in a ball-type simulation via a contact angle measuring device (model: CAM-100, made by CHENG FENG Corporation), as shown in FIG. 8, wherein the measurement result of the static contact angle was about 16 degrees. The results show that the nano-material layer of Example 1 had good hydrophilic property.

<Long Cycle Test>

The lithium battery of Example 1 was charged and discharged under the conditions of a current density of 10000 mA/g and a voltage of 0.01 V to 4.0 V. FIG. 9 shows the relationship between charge/discharge cycle number and capacity of the lithium battery of Example 1.

It can be known from FIG. 8 that, in comparison to a known lithium battery, the lithium battery of Example 1 had excellent long cycle and capacity. Specifically, the initial capacity of the lithium battery of Example 1 was 1010 mAh/g, and after 200 cycles, the capacity of the lithium battery of Example 1 was still 925 mAh/g.

The results show that, by using the electrode structure including the buffer layer and the nano-material layer for which the structure is nanowall as the anode, not only the capacity of the lithium battery can be increased, but also the cycle life of the lithium battery can be increased.

<Rate Capability Test>

The lithium battery of Example 1 was charged and discharged between 0.01 V and 4.0 V for during cycles at different current densities, wherein the different current densities include 500 mA/g, 1000 mA/g, 2000 mA/g, 4000 mA/g, 8000 mA/g, 12000 mA/g, 15000 mA/g, 20000 mA/g, and 25000 mA/g. FIG. 10 shows the relationship between charge/discharge cycle number and capacity of the lithium battery of Example 1.

It can be known from FIG. 10 that, when the lithium battery of Example 1 was charged and discharged at high current density (i.e., 1000 mA/g, 2000 mA/g, 4000 mA/g, 8000 mA/g, 12000 mA/g, 15000 mA/g, 20000 mA/g, or 25000 mA/g), the lithium battery of Example 1 still had good electrical performance. Moreover, even the lithium battery of Example 1 had been charged and discharged at high current density, when returning to low current density (i.e., 500 mA/g), the capacity of the lithium battery of Example 1 can still return close to the initial value. In other words, under high-current charge and discharge conditions, the electrode structure of Example 1 still had good stability, and therefore the lithium battery of Example 1 can show good rate performance.

The results prove that, even under high-current charge and discharge conditions, the electrode structure including the buffer layer and the nano-material layer for which the structure is nanowall still had good stability, and therefore a lithium battery adopting the electrode structure as the anode can show good rate performance.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An electrode structure, comprising:
   a substrate;
   a buffer layer disposed on the substrate; and
   a nano-material layer disposed on the buffer layer, wherein a structure of the nano-material layer is nanowall,
   wherein a material of each of the buffer layer and the nano-material layer comprises a copper-zinc-tin-sulfur compound, and an atomic ratio of sulfur in the buffer layer and an atomic ratio of sulfur in the nano-material layer are different.

2. The electrode structure of claim 1, wherein a material of the substrate comprises metal foil, transparent conductive glass, carbon material, silicon, or an organic polymer thin film.

3. The electrode structure of claim 1, wherein the nano-material layer is hydrophilic.

4. The electrode structure of claim 1, wherein a thickness of the buffer layer is 50 nanometers to 300 nanometers, and a thickness of the nano-material layer is 500 nanometers to 4000 nanometers.

5. A lithium battery, comprising:
   an anode, comprising the electrode structure of claim 1;
   a cathode separately disposed from the anode;
   a polymer separator disposed between the anode and the cathode, wherein the polymer separator, the anode, and the cathode define a housing region;
   an electrolyte solution disposed in the housing region; and
   a package structure packaging the anode, the cathode, and the electrolyte solution.

* * * * *